United States Patent
Loeffel et al.

(10) Patent No.: US 10,371,057 B2
(45) Date of Patent: Aug. 6, 2019

(54) FUEL INJECTOR DEVICE

(71) Applicant: ANSALDO ENERGIA SWITZERLAND AG, Baden (CH)

(72) Inventors: Kaspar Loeffel, Zurich (CH); Andre Theuer, Baden (CH); Nico Biagioli, Baden (CH); Alexey Stytsenko, Moscow (RU); Sergey Mylnikov, Moscow (RU); Igor Baibuzenko, Moscow (RU)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 525 days.

(21) Appl. No.: 15/084,177

(22) Filed: Mar. 29, 2016

(65) Prior Publication Data
US 2016/0290238 A1    Oct. 6, 2016

(30) Foreign Application Priority Data
Mar. 30, 2015    (EP) .................................... 15161686

(51) Int. Cl.
*F23R 3/20*    (2006.01)
*F02C 7/22*    (2006.01)

(52) U.S. Cl.
CPC .................. *F02C 7/22* (2013.01); *F23R 3/20* (2013.01); *F05D 2250/184* (2013.01); *F23C 2900/07001* (2013.01); *F23R 2900/00018* (2013.01)

(58) Field of Classification Search
CPC ...... F02C 7/22; F23R 3/14; F23R 3/20; F23R 2900/07001
See application file for complete search history.

(56) References Cited

U.S. PATENT DOCUMENTS 5,511,375 A    4/1996 Joshi et al.
5,634,327 A    6/1997 Kamber et al.
(Continued)

FOREIGN PATENT DOCUMENTS

EP    0 718 470 B1    6/1996
WO    WO 2015/023863 A1    2/2015
WO    WO 2015/042009 A1    3/2015

OTHER PUBLICATIONS

European Search Report dated Sep. 16, 2015, issued by the European Patent Office in the corresponding European Patent Application No. 15161686.9. (5 pages).
(Continued)

*Primary Examiner* — Arun Goyal
(74) *Attorney, Agent, or Firm* — Buchanan Ingersoll & Rooney PC

(57) ABSTRACT

Disclosed is a fuel injector device having a body with a leading edge and a trailing edge and defining a streamwise direction from the leading edge to the trailing edge, the fuel injector device body having a first wall and a second wall opposite the first wall, each wall extending between and including the leading edge and the trailing edge and the walls conjoining each other at the leading edge and the trailing edge, each wall having a streamwise extent and a crosswise extent, the walls further enclosing an internal space, at least one fluid plenum being provided within the internal space, the fluid plenum at least at one of an upstream end and/or a downstream end being delimited by an internal wall structure, wherein at least one surface of the wall structure is an inclined surface which forms an angle with the streamwise direction which is smaller than or equal to a maximum angle, wherein the maximum angle is 60°.

12 Claims, 6 Drawing Sheets

(56) References Cited

U.S. PATENT DOCUMENTS

| | | | |
|---|---|---|---|
| 5,941,064 A | 8/1999 | Chevalier et al. | |
| 8,104,286 B2* | 1/2012 | Zuo | F23R 3/14 |
| | | | 239/399 |
| 8,393,157 B2* | 3/2013 | Dinu | F23R 3/286 |
| | | | 239/399 |
| 8,490,398 B2* | 7/2013 | Poyyapakkam | F23R 3/286 |
| | | | 431/350 |
| 8,677,756 B2* | 3/2014 | Poyyapakkam | F23C 5/08 |
| | | | 239/403 |
| 2007/0151250 A1 | 7/2007 | Haynes | |
| 2009/0184181 A1 | 7/2009 | Berry et al. | |
| 2012/0272659 A1 | 11/2012 | Syed et al. | |
| 2012/0285173 A1 | 11/2012 | Poyyapakkam et al. | |
| 2012/0297777 A1 | 11/2012 | Poyyapakkam et al. | |
| 2013/0036745 A1 | 2/2013 | Haynes | |
| 2016/0252251 A1* | 9/2016 | Biagioli | F02C 7/057 |
| | | | 60/779 |

OTHER PUBLICATIONS

European Search Report dated Sep. 18, 2015, issued by the European Patent Office in the corresponding European Patent Application No. 15161690.1. (5 pages).

* cited by examiner

FUEL INJECTOR DEVICE

TECHNICAL FIELD

The present disclosure relates to a fuel injector device as described in claim 1. It further relates to a combustor and a gas turbine engine comprising a fuel injector device of the aforementioned type.

BACKGROUND OF THE DISCLOSURE

In combustors, in order to achieve acceptable exhaust gas pollutant levels, thorough mixing of fuel with the oxidant, such as, most commonly used, air, is required before the fuel is burnt. In gas turbines with so-called sequential combustion, such as e.g. described in EP 0 718 470 B1, subsequent combustors are provided with partly expanded, still oxygen-rich, flue gas from a preceding turbine, serving as the oxidant. In such gas turbines, and there in particular in the subsequent combustors, the oxidant entering the combustor, that is, partly expanded flue gas, has a temperature in excess of a fuel self-ignition temperature. That is, the fuel will, after a certain ignition delay time, ignite spontaneously. It is thus crucial to achieve a complete and uniform fuel/oxidant mixing within a limited time frame before the fuel ignites.

US 2012/0272659 A1 for instance discloses a fuel injector device having a generally airfoil-like shape, with a trailing edge having an undulating shape across the flow direction, wherein said undulating aerodynamic cross section develops in a streamwise direction from the leading edge to the trailing edge. At the trailing edge, flows having opposite velocity components across the main flow direction meet and intermingle, and develop vortices propagating downstream from the trailing edge, said vortices having a center of rotation essentially at inflection points of the undulating trailing edge. Fuel is injected through fuel injection means arranged at the trailing edge essentially at said inflection points, and, due to the vortices, is intensively admixed with the oxidant.

The internal geometry of this device is, however, highly complex. Multiple plenums for cooling air, carrier air and at least one fuel need to be provided inside the device. Also, means for guiding and discharging the various fluids need to be provided. Thus, such devices need to be assembled form a multitude of individual parts. The assembly is complex, expensive, and restricts the design possibilities.

LINEOUT OF THE DISCLOSURE

It is an object of this disclosure to describe an advanced fuel injector device.

The present disclosure proposes a fuel injector device having the advantageous properties of the device known in the art, while being easier to manufacture.

It is a further object of the present disclosure to provide a fuel injector device which allows for a greater design flexibility, which in turn allows for further improvement e.g. of the fuel/oxidant mixing, and a more efficient use of cooling air.

In a further aspect a fuel injector device is disclosed which is designed and shaped such as to be efficiently producible. In a more specific aspect of the disclosure a fuel injector device is disclosed which is designed and shaped such as to be efficiently producible by an additive manufacturing method, such as for instance, but not limited to, selective laser melting or electron beam melting.

This is achieved by the subject matter described in claim 1.

Further effects and advantages of the disclosed subject matter, whether explicitly mentioned or not, will become apparent in view of the disclosure provided below.

Disclosed is a fuel injector device comprising a body, said body comprising a leading edge and a trailing edge. A streamwise direction is defined from the leading edge to the trailing edge. The fuel injector device body comprises a first wall and a second wall opposite the first wall, each of said walls extending between and comprising the leading edge and the trailing edge, and said walls conjoining each other at the leading edge and the trailing edge. Each wall has a streamwise extent and a crosswise extent across and in particular perpendicular to the streamwise extent. It is understood that the walls, along the crosswise extent may be straight such that the fuel injector device may assume a bar-like shape. Likewise, the walls may be curved along the crosswise extent, such that the fuel injector device may assume for instance a can shape or a conical shape or a part-cylindrical or a part-frustoconical shape. The walls enclose an internal space, at least one fluid plenum being provided within the internal space. The fluid plenum is at least at one of an upstream end and/or a downstream end delimited by an internal wall structure. At least one surface of said internal wall structure is an inclined surface which forms an angle with the streamwise direction which is smaller than or equal to a maximum angle, wherein said maximum angle is 60°.

In more specific embodiments the maximum angle may be 40° or 45°.

Streamwise or streamwise direction, in the context of this document, shall mean the non-directional orientation between the leading edge and the trailing edge. Upstream, in the context of this document, is understood as a directional streamwise orientation from the trailing edge to the leading edge against the direction of flow.

Downstream, in the context of this document, is understood as a directional streamwise orientation from the leading edge to the trailing edge in the direction of flow.

Generally, in the further course of the present disclosure, the term "inclined surface" will be used for a surface which forms an angle with the streamwise direction which is smaller than or equal to the maximum angle defined above.

As will become apparent, an inclined surface may in certain embodiments include an angle with a transverse direction, wherein the transverse direction extends from an inner surface of the first wall to in inner surface of the second wall and is in particular perpendicular to the streamwise direction and the crosswise direction, wherein said angle is larger than or equal to 90° minus the maximum angle.

Due to these inclined surfaces, producing the fuel injector device by means of additive manufacturing methods, such as for instance selective laser melting or selective electron beam melting, where layer by layer a metal powder is selectively molten and re-solidified, is largely facilitated. This is achieved in that the production of large-scale overhang structures which extend across a buildup direction is avoided. If, for instance, an overhang structure is to be manufactured by selective laser melting, or other additive manufacturing methods, in one layer, the overhang structure, if no support for the new layer of solidified material is provided, may bend. As a result, a weak product quality may be found, or the manufacturing process might be canceled. If said overhang structures are appropriately inclined, as is possible during manufacturing of the disclosed device, for each layer only a small overhang will be produced with a short cantilevering length. Thus, each small overhang will be sufficiently supported by previously solidified material.

The device as disclosed is thus particularly well suited for being manufactured by an additive manufacturing process, with the buildup direction directed either from the trailing edge to the leading edge or vice versa, as the walls of the injector device body extend in the buildup direction, and a transverse structure, such as for instance the internal wall structure delimiting a fluid plenum in a streamwise direction, forms an inclined, that is, not a horizontal, structure during manufacturing. Thus, large scale overhangs extending at a large angle, in particular perpendicular to, the buildup direction are avoided.

In an aspect of the present disclosure thus a fuel injector device of the kind initially mentioned, and described above, is disclosed which is seamless and consequently has been manufactured without assembly steps. That is, it is not assembled from a multitude of parts, but is a monolithic, one-piece element, which is, with consideration of the complex internal geometry, primarily achievable by the above-mentioned additive manufacturing methods.

The body of the fuel injector device may in particular have an aerodynamic longitudinal section. Downstream, along the streamwise direction, the body may develop an increasingly undulated shape when seen in the streamwise direction, with an amplitude of the undulation increasing from the leading edge, or a position downstream the leading edge, towards the trailing edge. The fuel injector device thus may have an undulating trailing edge. The leading edge may be straight or curved but non-undulating, and may in certain embodiments describe a circular or part-circular shape. An exemplary fuel injector device body is disclosed in US 2012/0272659 A1, which document in this respect is incorporated by reference.

In certain embodiments of the fuel injector device according to the present disclosure, each of an upstream surface and a downstream surface of the internal wall structure is an inclined surface and forms an angle with the streamwise direction which is smaller than or equal to the maximum angle. In particular the surfaces may be parallel to each other, that is, said angles are identical on the upstream and downstream side, resulting in a constant thickness of the internal wall structure.

In a further embodiment at least two internal wall structures are provided in the internal space and each internal wall structure comprises at least one inclined surface, wherein further at least the surfaces of all wall structures which point into an identical streamwise orientation are provided as inclined surfaces. In other words, all surfaces of internal wall structures pointing downstream along the streamwise direction and/or all surfaces pointing upstream along the streamwise direction are inclined surfaces.

According to an aspect, the inclined surface comprises at least two inclined surface sections, wherein each inclined surface section forms an angle with the streamwise direction which is smaller than or equal to the maximum angle, and wherein the surface sections are inclined with respect to the streamwise direction in opposite senses. In particular, two inclined surface sections which are inclined with respect to the streamwise direction in opposite senses together form a surface of an internal wall structure. That means, the surface sections form an apex and two legs, wherein in particular the apex points upstream or downstream along the streamwise direction. More in particular, the first and second surface sections meet each other and are joined by a transition surface, wherein in particular the transition surface is rounded.

According to still a further aspect of the present disclosure, the fuel injector device comprises at least one of
a cooling air plenum,
a carrier air plenum,
a first fuel plenum, and/or
a second fuel plenum
provided inside the internal space and delimited at least at one streamwise end by an internal wall structure having an inclined surface. In specific embodiments, the first fuel plenum may be a fuel oil plenum and the second fuel plenum may be a fuel gas plenum.

In a more particular embodiment the fuel injector device comprises a cooling air plenum, wherein the cooling air plenum is delimited at a downstream end by a first internal wall structure, a carrier air plenum, the carrier air plenum being delimited at an upstream end by the first internal wall structure and being delimited at a downstream end by a second internal wall structure, and a first fuel plenum, the first fuel plenum being delimited at an upstream end by the second internal wall structure, wherein the upstream surfaces of all internal wall structures and/or the downstream surfaces of all internal wall structures are inclined surfaces. In particular, the cooling air plenum may be delimited at an upstream end by the first and second walls of the fuel injector device body.

In still a more particular embodiment the fuel injector device comprises a second fuel plenum, wherein the first fuel plenum is delimited at a downstream end by a third internal wall structure and the second fuel plenum is delimited at an upstream end by the third internal wall structure, wherein the upstream surfaces of all internal wall structures and/or the downstream surfaces of all internal wall structures are inclined surfaces.

In even more particular embodiments all internal structures provided inside the internal space comprise inclined surfaces, and still more in particular all upstream and downstream surfaces of said internal structures are inclined surfaces.

At least one fuel plenum may be enclosed by a fuel plenum shell, an upstream end of the fuel plenum shell being provided as an internal wall structure having an inclined surface, wherein the fuel plenum shell is provided within the internal space and is supported by struts, said struts connecting the fuel plenum shell and the first internal wall structure. The struts may also have a longitudinal extent along the streamwise direction. Thus, also the struts may be designed in a way which is well-suited for being manufactured by an additive manufacturing method. The struts may also provide some flexibility to the support of the fuel plenum shell, which may serve to account for differential thermal expansion. A second fuel plenum may be disposed inside the fuel plenum shell.

Further disclosed is a combustor, in particular a gas turbine combustor, comprising a fuel injector device according to the present disclosure.

Still further disclosed is gas turbine comprising a combustor of the aforementioned kind, wherein in particular the gas turbine is a sequential combustion gas turbine engine and more in particular the combustor is a subsequent combustor which is supplied with partly expanded flue gas from a turbine, as is disclosed for instance in EP 0 718 470 B1, said document in this respect being incorporated by reference.

It is understood that the features and embodiments disclosed above may be combined with each other. It will further be appreciated that further embodiments are conceivable within the scope of the present disclosure and the claimed subject matter which are obvious and apparent to the skilled person.

BRIEF DESCRIPTION OF THE DRAWINGS

The subject matter of the present disclosure is now to be explained in more detail by means of selected exemplary embodiments shown in the accompanying drawings. The figures show FIG. 1 a fuel injector device according to the present disclosure in a side view and a perspective view.

It is understood that the drawings show only selected, illustrative embodiments, and embodiments not shown may still be well within the scope of the herein claimed subject matter.

EXEMPLARY MODES OF CARRYING OUT
THE TEACHING OF THE PRESENT
DISCLOSURE

Figure 1:
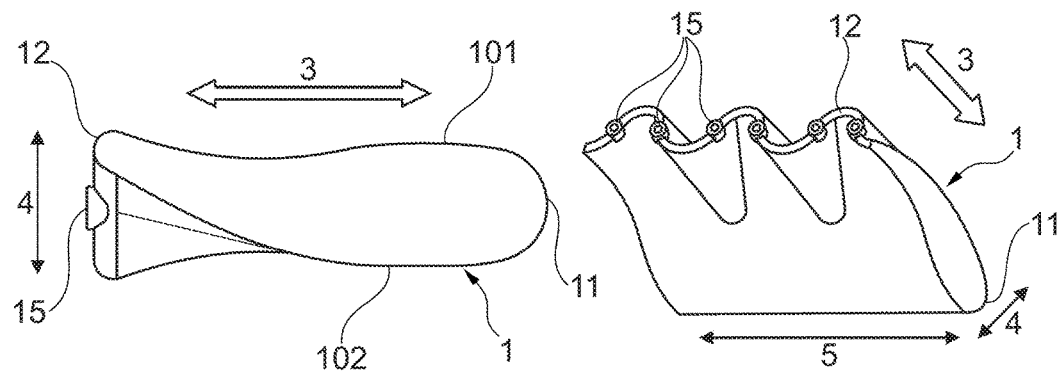

A general view of an exemplary embodiment of the fuel injector device according to the present disclosure is shown in FIG. 1. The left part of the figure shows a side view, while the right part of the figure shows a perspective view. As is seen in the side view, the fuel injector device 1 comprises a body, having, in a longitudinal section, an aerodynamic shape, generally resembling an airfoil. The fuel injector device comprises a leading edge 11 and a trailing edge 12, and has a streamwise direction between the leading edge and the trailing edge, depicted at 3. The fuel injector device body further comprises a first surface 101 and a second surface 102 opposite the first surface, each of said surfaces extending between and comprising the leading edge and the trailing edge, and said surfaces conjoining each other at the leading edge and the trailing edge. The surfaces 101 and 102 extend along the streamwise direction 3 and along a crosswise direction 5, depicted in the right part of FIG. 1. The fuel injector device is bar-shaped. A transverse direction 4 extends between the two surfaces 101 and 102 and is in particular perpendicular to the streamwise direction 3 and the crosswise direction 5. As can be seen, the profile of the airfoil-shaped longitudinal section changes from one longitudinal section to a neighboring longitudinal section across the fuel injector device body, resulting in a trailing edge 12 undulating when seen along the streamwise direction, or, across a main flow direction. A number of fuel discharge means 15 are provided on the trailing edge 12.

Figure 2:
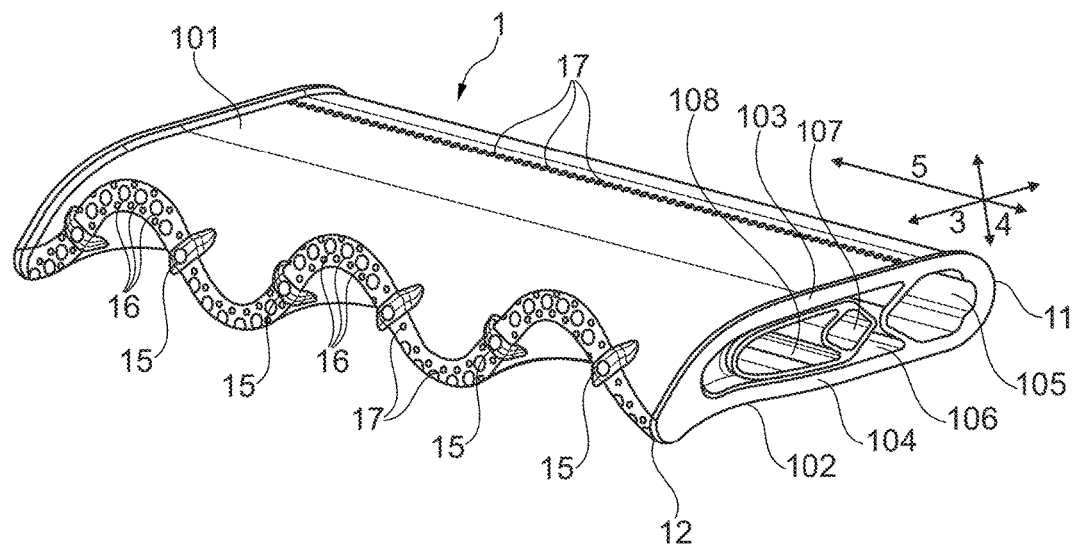
FIG. 2 a more detailed view of an exemplary embodiment of a fuel injector device in a perspective view.

FIG. 2 shows a fuel injector device according to the present disclosure in a perspective view in more detail. Fuel injector device 1, as mentioned above, comprises leading edge 11, trailing edge 12, and surfaces 101 and 102 extending between and comprising the leading and the trailing edge. A number of fuel discharge means 15, as already mentioned in connection with FIG. 1, are arranged on the trailing edge. Furthermore, a number of second fuel discharge means 16 is provided on the trailing edge. Moreover, cooling air outlet means 17 are provided on the surfaces 101 and 102, respectively, and on the trailing edge. The first surface 101 is provided on a first wall 103 of the fuel injector device body, whereas the second surface 102 is provided on a second wall 104 of the fuel injector device body, said walls enclosing an internal space. Just like the surfaces 101 and 102, the walls 103 and 104 extend between and comprise the leading edge and the trailing edge, and conjoin at the leading edge and the trailing edge. Inside the internal space, a cooling air plenum 105, a carrier air plenum 106, a first fuel plenum 107 and a second fuel plenum 108 are provided. Cooling air supplied to cooling air plenum 105 is led through near wall cooling channels (not visible in this depiction) in order to cool the walls 103 and 104, and is discharged through the cooling air outlet means 17. Fuel is supplied to the first and second fuel plenum and is discharged through fuel discharge means 15 and 16. Carrier air supplied to the carrier air plenum 106 is discharged through the carrier air openings arranged at the fuel discharge means. To that extent, a number of ducts for guiding the fluids to the respective discharge openings need to be provided inside the fuel injector device.

Figure 3:
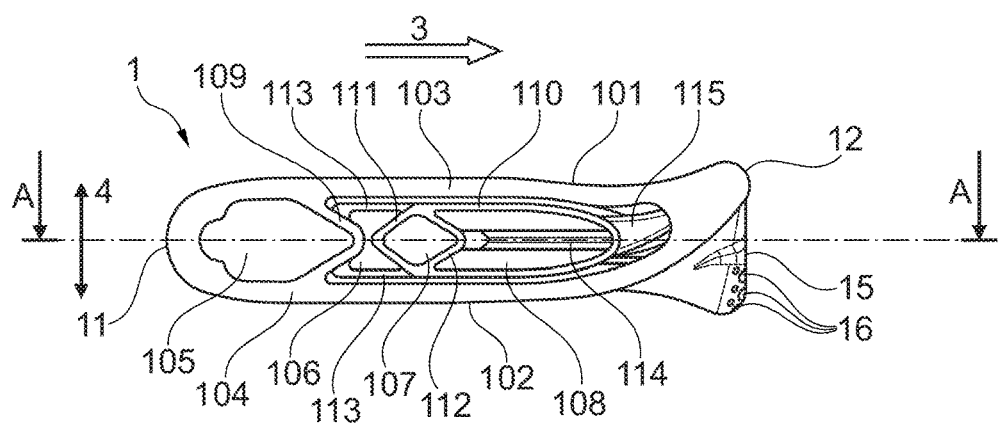
FIG. 3 a side view of the device of FIG. 2.

FIG. 3 shows a more detailed side view of the fuel injector device 1. The fuel injector device 1 comprises a first wall 103 on which the surface 101 is provided, and a second wall 104 on which the surface 102 is provided. The walls extent between and comprise the leading edge 11 and the trailing edge 12, and the walls conjoin each other at the leading edge and the trailing edge. An internal space is enclosed by the walls. This internal space comprises a cooling air plenum 105, a first fuel plenum 107, a second fuel plenum 108, and a carrier air plenum 106. The fuel plenums 107 and 108 are enclosed by a fuel plenum shell 110. The shell is supported within the internal space by struts 113. From the first fuel plenum 107, in this exemplary embodiment a fuel oil plenum, a fuel oil nozzle 114 leads to fuel discharge means 15. The fuel oil nozzles 114 are fed all the way through the second fuel plenum. The second fuel plenum 108 is in this embodiment intended as a fuel gas plenum, and fuel gas conduits 115 connect the fuel gas plenum to fuel gas discharge means 16. The shell 110 has no contact with inner surfaces of the walls 103 and 104 and a gap is formed between the shell 110 and the walls 103 and 104, and thus carrier air is able to flow around the shell to the fuel discharge means 15 and 16, and can, in a manner known in the art, be discharged as carrier air at the fuel discharge means. The cooling air plenum is on its downstream end delimited by internal wall structure 109. The carrier air plenum is on its upstream end delimited by internal wall structure 109, and is on its downstream end delimited by internal wall structure 111, which at the same time is a part of the shell 110. The first fuel plenum 107 is on its upstream end delimited by internal wall structure 111 and is on its downstream end delimited by internal wall structure 112. The second fuel plenum 108 is on its upstream end delimited by internal wall structure 112, and is on its downstream end delimited by a downstream part of the shell. All internal wall structures do not extend merely in the transverse direction 4, but the internal wall structures are inclined with respect to the transverse direction 4, such as to form an apex and two legs, with the apex pointing upstream or downstream along the streamwise direction 3. In other words, the wall structures are inclined with respect to the streamwise direction at an angle of less than 90°. The apexes of wall structures 109 and 111 meet. Thus, they mutually support each other in case the device is manufactured by means of an additive manufacturing process, such as for instance selective laser melting, along the streamwise direction.

Figure 4:
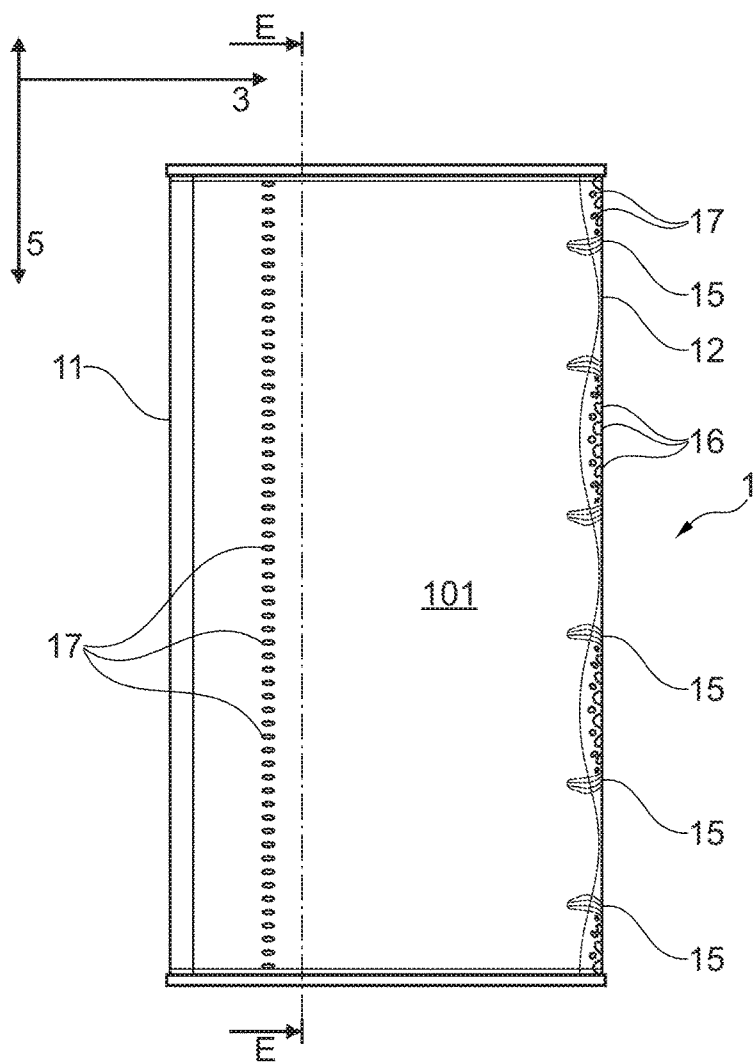
FIG. 4 a top view of the device of FIG. 2.

FIG. 4 depicts a top view of the fuel injector device 1. Visible is the first surface 101, which extends along the streamwise direction 3 from the leading edge 11 to the trailing edge 12, and further extends in a crosswise direction 5. On the trailing edge fuel discharge means 15 and 16 are provided. Moreover, cooling air discharge means 17 are visible on the first surface 101 and on the trailing edge 12.

Figure 5:
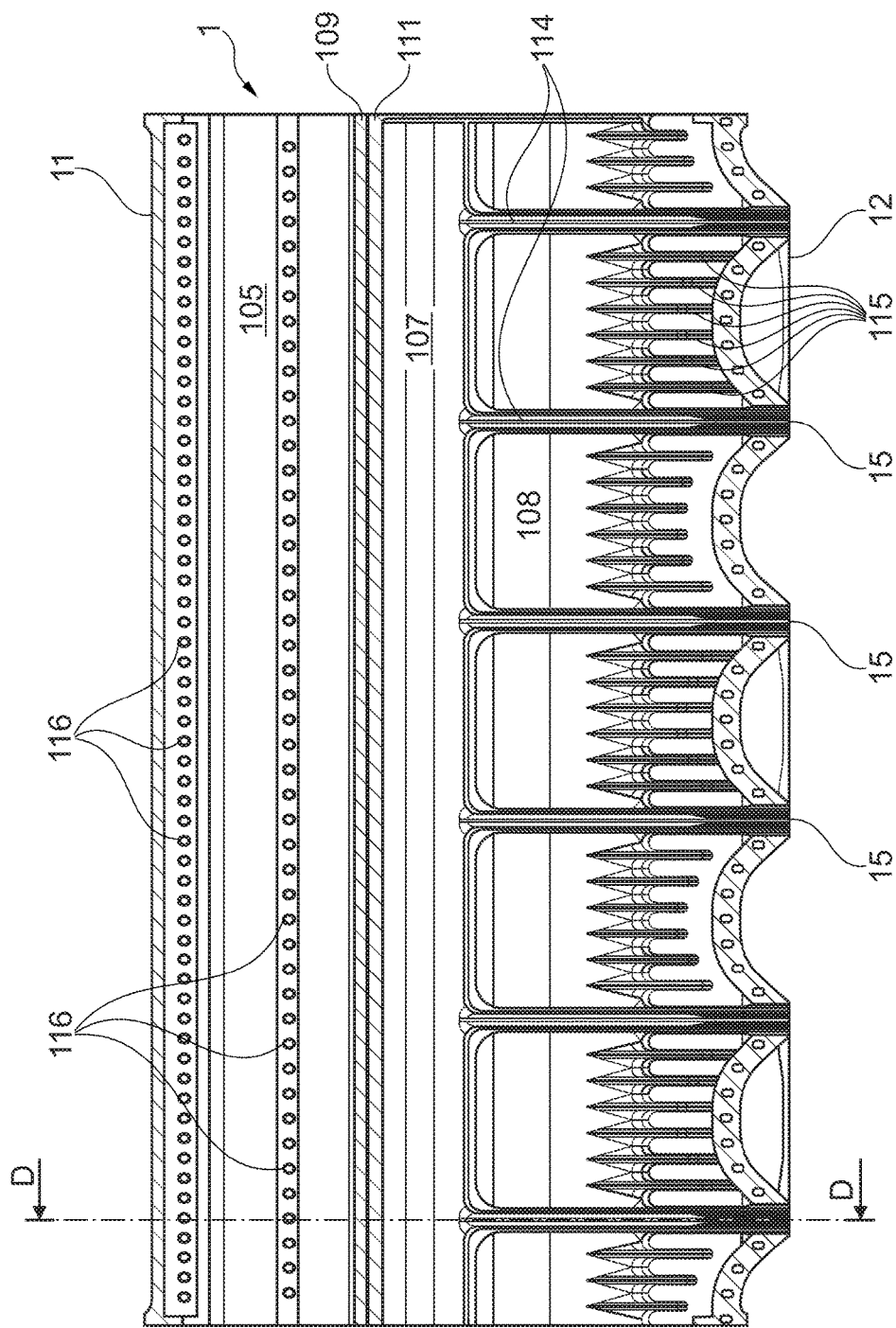
FIG. 5 a first cut through the device of FIG. 2.

FIG. 5 depicts a cut along line A-A of FIG. 3, and lines out the internal structure in more detail. A multitude of fuel oil nozzles 114 extend from the first fuel plenum 107 and through the second fuel plenum 108 to the first fuel discharge means 15.

Second fuel conduits 115 extend from the second fuel plenum 108 to the second fuel discharge means, which are not visible in this depiction. Cooling air channels 116 branch off cooling air plenum 105.

Figure 6:
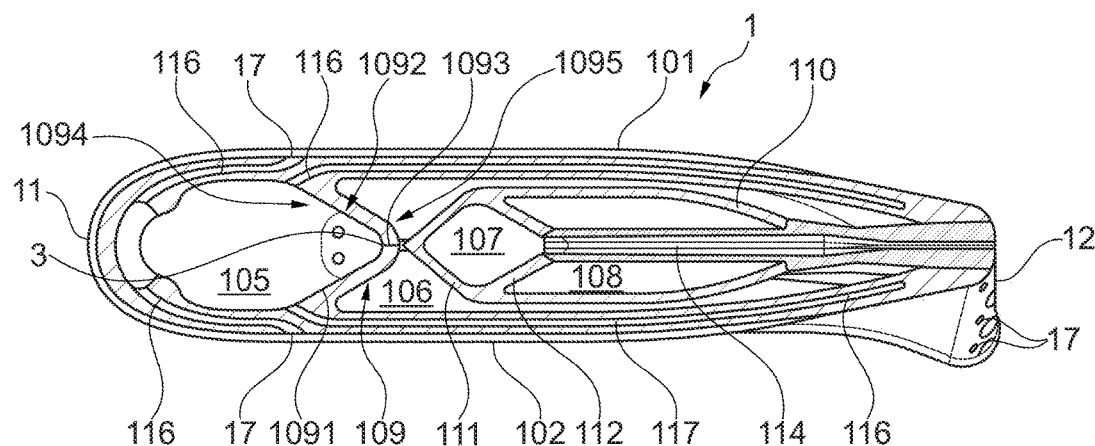
FIG. 6 a second cut through the device of FIG. 2.

A cut along line D-D of FIG. 5 is depicted in FIG. 6. As becomes apparent from the depiction, cooling air channels 116 branch off cooling air Plenum 105 and extend through the walls of the injector device body close to the surfaces 101 and 102 as near wall cooling channels. The cooling air is discharged at the cooling air discharge means 17 provided on the surfaces 101 and 102, and on the trailing edge 12. Each of the wall structures 109, 111, and 112 comprises an upstream surface and a downstream surface. Each of said surfaces may be considered to comprise two surface sections, which are inclined against the streamwise direction 3 in opposite senses. For instance, the wall structure 109 has on its upstream side an upstream surface 1094 and on its downstream side a downstream surface 1095. The upstream surface, for instance, comprises a first surface section 1091 and a second surface section 1092 which are connected by a rounded transition region 1093. Each of the surface sections 1091 and 1092 is inclined with respect to the streamwise direction at an angle which is different from 90°. The surface sections 1091 and 1092 are inclined in opposite senses. For instance, in the exemplary embodiment shown, both surface sections are inclined with respect to the streamwise direction 3 at an angle a, which is in this embodiment approximately 35°, in opposite senses, that is, in this depiction, upward and downward. Likewise, all transverse structures provided inside the internal space of the fuel injector device body are inclined with respect to the streamwise direction 3 at an angle of less than 90°, wherein this angle is smaller than or equal to a maximum angle. As will be lined out below, by virtue of these geometric restrictions the fuel injector device is particularly well-suited for being produced by means of an additive manufacturing process, such as, for instance, selective laser melting, with the buildup occurring from the trailing edge towards the leading edge, or vice versa. Due to this specific geometry, no large overhang structures will occur during manufacturing along the streamwise direction.

Figure 7:
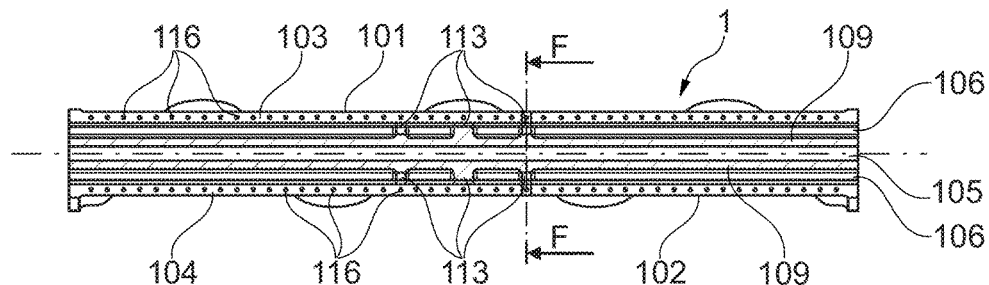
FIG. 7 a third cut through the device of FIG. 2.
Figure 8:
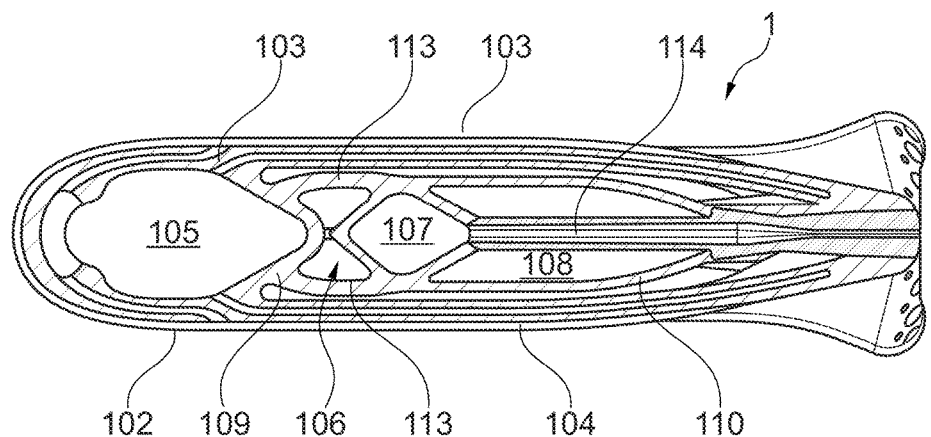
FIG. 8 a fourth cut through the device of FIG. 2.

FIG. 7 shows a cut along line D-D of FIG. 4. It is seen how a multitude of cooling air channels 116 extend through the walls 103 and 104. Furthermore, internal wall structure 109 is visible. Struts 113 extend from wall structure 109. The structure and function of the struts 113 will become more apparent by the depiction of FIG. 8, which shows a cut along line F-F of FIG. 7. Struts 113 also extend predominantly along the streamwise direction. They extent from wall structure 109, which is rigidly connected to the outer walls 103 and 104, and provide a support for the fuel plenum shell 110. As is seen by a combination of FIGS. 7 and 8, the shell 110 is supported only at the center of the fuel injector device, and thus differential thermal expansion of the shell and the fuel injector device body in the crosswise direction is enabled. This may be found useful, as the fuel provided to the fuel plenums 107 and 108 will commonly be significantly colder than the high-pressure compressed air provided as cooling air or carrier air, respectively, to cooling air plenum 105 and to carrier air plenum 106.

Figure 9:
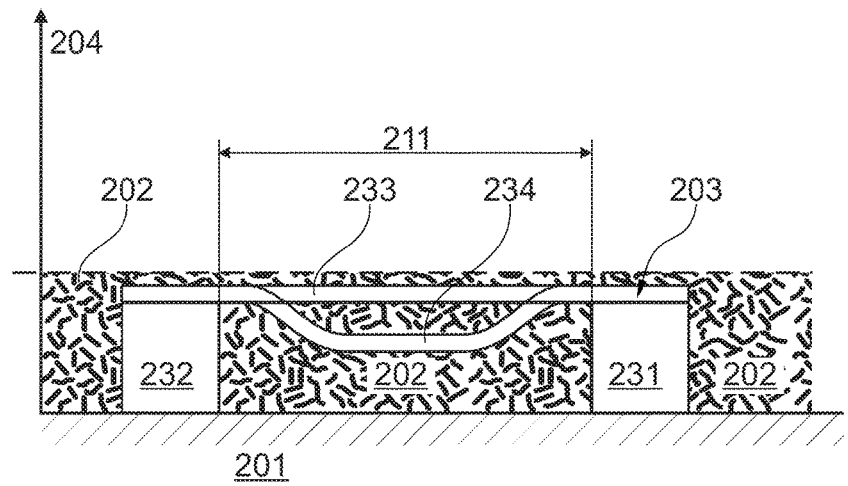
FIG. 9 an illustration illustrating the problems associated with manufacturing overhang structures in applying selective laser melting.
Figure 10:
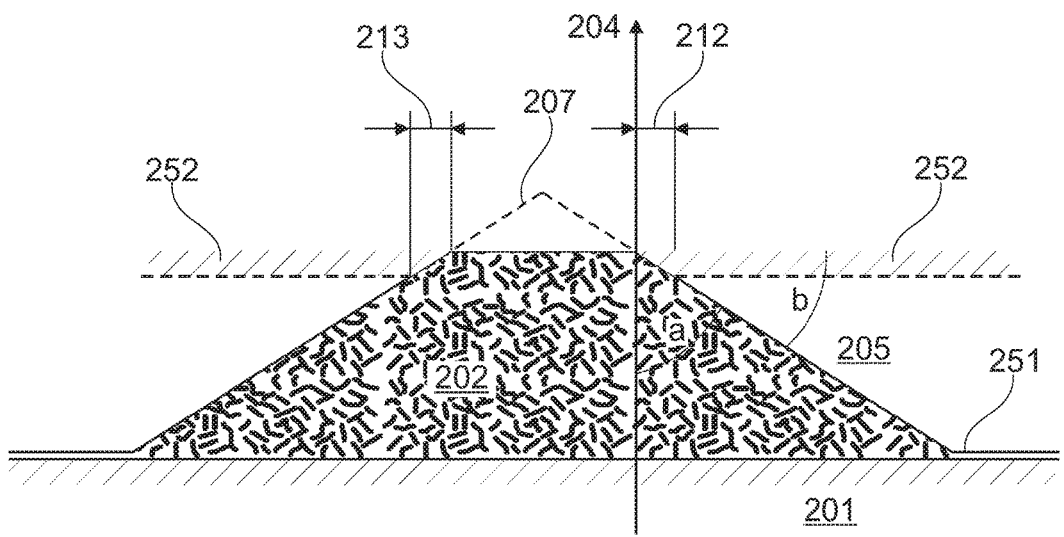
FIG. 10 an illustration of mitigating the problem when applying a selective laser melting process to the manufacture of the device as herein disclosed.

With respect to FIGS. 9 and 10, it is shown how the fuel injector device according to the present disclosure is specifically well-suited for being produced by an additive manufacturing process, such as selective laser melting, with the buildup direction along the streamwise direction.

Turning to FIG. 9, the production of a component with a transverse structure by a selective laser melting process is schematically shown. In a selective laser melting process a metal powder 202 is disposed on a build platform 201. It is noted, that the bed of metal powder 202 shown in FIG. 9 is not disposed in one step, but disposed in consecutive layers. Between each disposal step the actual laser melting process takes place. A laser beam of appropriate power is directed onto the metal powder, and advanced on the surface of the metal powder, such that the metal powder is locally molten and subsequently re-solidified. By repeating the steps of disposing metal powder, melting, and re-solidifying, an element 203 is built. The process of disposing one layer above another advances along the buildup direction 204 which may generally be bottom to top, or vertical. In the state depicted in FIG. 9, two fragments 231 and 232 of element 203 have been built. In an additional processing step a layer 233 bridging the two fragments is produced. Layer 233 bridges a distance 211 between the fragments 231 and 232 as a bridging layer. Initially, the bridging layer 233 is formed by only one layer of solidified metal. Typically, the thickness of this layer is from about 10 to about 100 micrometers, without a solid support along the whole bridged distance. Thus, there is an imminent danger that the initially built bridging layer 233 will bend in response to its own weight and/or the weight of the subsequent layer of metal powder disposed thereon, as indicated at 234.

However, when building the fuel injector device according to the present disclosure, the problem is mitigated as depicted in FIG. 10. Starting at the build platform 201, metal powder 202 is disposed on the build platform layer by layer. For each layer, the melting and re-solidifying step is carried out along a buildup direction 204. A component or element 205 is thus manufactured starting from a base side 251. In order to manufacture an overhang structure, the overhang structure is manufactured such that it is tilted against the buildup direction 204 at an angle a. As previously mentioned, the buildup direction may typically be from bottom to top, thus, the overhang structure is tilted against a horizontal line, or, a top surface of the component 205, at an angle b. As is seen, in manufacturing an additional layer 252 on top of component 205 the resulting cantilevering distance depicted at 212 and 213 gets comparatively small. The cantilevering distance depends on the thickness of the top layer 252 and the angles a or b, respectively. The smaller angle a is chosen, which is, assuming buildup of an injector device occurs along the device streamwise direction, the angle a surface of a wall structure includes with the streamwise direction, the smaller the cantilevering distance of the top layer 252 gets. If said angles are chosen appropriately, the cantilevering distance 212 and 213 is small enough to bear its own weight and the weight of powder disposed on top of it in a subsequent recoating step. With a typical thickness of top layer 252 in a range from 10 to 100 micrometers, and angle a not exceeding for instance 60°, the cantilevering distance will in any case be less than 0.2 millimeters. As a result, a wedge shaped overhang structure as indicated by the dashed lines at 207 will be manufactured. Thus, internal wall structures of the device can be safely manufactured. Further, as lined out above, wall structures built up consecutively may support each other.

Figure 11:
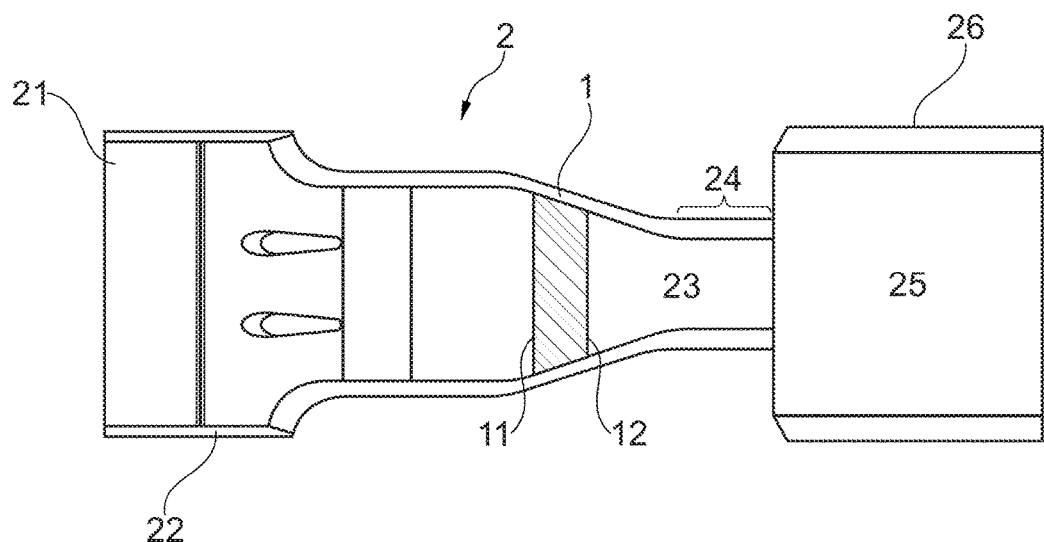
FIG. 11 a combustion chamber comprising a fuel injector means as described above.

FIG. 11 depicts the application of the fuel injector device as described above in a combustion chamber, in particular in a combustion chamber 2 for sequential combustion, as disclosed for instance in EP 718 470. The upstream end 21 is, in a manner known in the art, connected to the exhaust flow of a preceding turbine stage and typically receives still oxygen-rich flue gas from said turbine, which may be used as an oxidant for the subsequent combustion stage. The gas entering into combustion chamber 2 typically is in the temperature range of several hundred ° C., close to 1000° C., and even in excess of 1000° C. Fuel brought into full contact with this hot gas will thus spontaneously ignite after a short ignition delay time. Flow conditioning elements 22, suited to even out the highly turbulent flow emanating from the upstream turbine, are arranged in a flow path. The fuel injector device 1 is arranged at a location of the combustion chamber where the flow path narrows. The hot gas or hot oxidant flow introduced into the combustion chamber 2 at the upstream end 21 flows over the fuel injector device leading edge 11, and forms vortices at the undulating trailing edge 12. Fuel is discharged at the trailing edge 12 and enters, together with the oxidant, a mixing zone 23 of the combustion chamber, formed in a narrowed section 24. Due to the discharge of the fuel into the vortices formed downstream trailing edge 12, the fuel is intensely mixed with the hot oxidant. The narrowed or bottleneck section 24 accelerates the flow, such as to avoid a flashback of the flame into the mixing zone 23. Furthermore, due to the narrowed section 24, the residence time of the fuel/oxidant mixture in the mixing zone 23 is shortened. This, in turn, is suited to avoid spontaneous self-ignition of the fuel inside the mixing zone. Due to the intense fuel/oxidant mixing achieved in applying the fuel injector device as described herein, the fuel and the oxidant are completely mixed upon reaching the cross-sectional jump 25, and entering the actual combustion zone 26 where the fuel/oxidant mixture is burnt.

Figure 12:
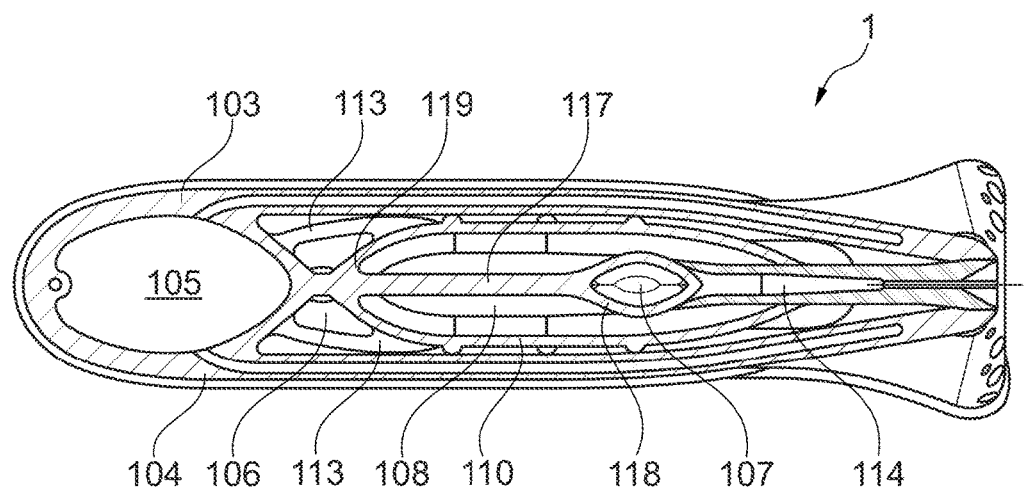
FIG. 12 a view of an alternative embodiment of the fuel injector device.

FIG. 12 depicts a longitudinal cut side view of an alternative embodiment of a fuel injector device as described herein. It varies from the embodiment lined out in detail in connection with FIGS. 1 through 8 in that the first fuel plenum or, in this embodiment, fuel oil plenum 107 is provided as an essentially tubular member 118 provided inside, and extending in the crosswise direction within, the second fuel plenum, or, in this embodiment, fuel gas plenum 108, and extends in the crosswise direction therethrough. The tubular fuel oil plenum shell is supported inside the fuel gas plenum by support struts 117 extending from a support node in the streamwise direction. As is seen, the tubular plenum 107, or, respectively, the tubular plenum shell 118, do not have circular cross sections, but said cross sections are prolate, in order to provide the required inclination, or maximum angles with the streamwise direction, in order to facilitate manufacturing the device by the above-mentioned additive manufacturing methods.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

LIST OF REFERENCE NUMERALS

1 fuel injector device
2 combustion chamber
3 streamwise direction
4 transverse direction
5 crosswise direction
11 leading edge
12 trailing edge
15 fuel discharge means
16 fuel discharge means
17 cooling air outlet means
21 combustor upstream end
22 flow conditioning elements
23 combustor mixing zone
24 narrowed section
25 cross sectional jump
26 combustion zone
101 first surface
102 second surface
103 first wall
104 second wall
105 cooling air plenum
106 carrier air plenum
107 fuel plenum
108 fuel plenum
109 internal wall structure
110 fuel plenum shell
111 internal wall structure
112 internal wall structure
113 strut
114 fuel oil nozzle
115 fuel gas conduit
116 cooling air channel
117 fuel oil plenum support strut
118 fuel oil plenum shell
119 support node
201 build platform
202 metal powder
203 element
205 element
207 wedge shaped overhang distance
212 cantilevering distance
213 cantilevering distance
231 element fragment
232 element fragment
233 bridging layer
234 deformed bridging layer
251 base side
252 material layer
1091 surface section
1092 surface section
1093 transition region
1094 upstream surface
1095 downstream surface
a angle
b angle

The invention claimed is:

1. A fuel injector device comprising:
    a body, said body having a leading edge and a trailing edge and defining a streamwise direction from the leading edge to the trailing edge, the body of the fuel infector having a first wall and a second wall opposite the first wall, the first wall and the second wall extending between and including the leading edge and the trailing edge and said first wall and said second wall conjoining each other at the leading edge and the trailing edge,
    both the first wall and the second wall having a streamwise extent and a crosswise extent,
    said first wall and said second wall enclosing an internal space, and
    at least one fluid plenum being provided within the internal space, the fluid plenum having at least at one of an upstream end and/or a downstream end being delimited by an internal wall structure, wherein the at least one fluid plenum comprises:
    a cooling air plenum, the cooling air plenum being delimited at a downstream end by a pair of first internal walls of the internal wall structure,
    a carrier air plenum, the carrier air plenum being delimited at an upstream end by the pair of first internal walls and being delimited at a downstream end by a pair of second internal walls of the internal wall structure, and
    a first fuel plenum, the first fuel plenum being delimited at an upstream end by the pair of second internal walls,
    wherein the pair of first internal walls and the pair of second internal walls, each form an apex wherein an angle between each wall of the pair of first internal walls and between each wall of the pair of second internal walls is smaller than or equal to 120°.

2. The fuel injector device according to claim 1, wherein each of an upstream surface and a downstream surface of the pair of first internal walls and each of an upstream surface and a downstream surface of the pair of second internal walls form an apex wherein an angle between each pair of first upstream surfaces and each pair of first downstream surfaces of the pair of first internal walls and between each pair of second upstream surfaces and each pair of second downstream surfaces of the pair of second internal walls is smaller than or equal to 120°.

3. The fuel injector device according to claim 1, wherein each of the first pair of internal walls and the second pair of internal walls respectively meet each other and are joined by a transition surface, wherein the transition surface is rounded.

4. The fuel injector device according to claim 1, comprising:
    a second fuel plenum, wherein the first fuel plenum is delimited at a downstream end by a pair of third internal walls and the second fuel plenum is delimited at an upstream end by the pair of third internal walls,
    wherein upstream surfaces of the pair of third internal walls and/or downstream surfaces of the pair of third internal walls are inclined surfaces.

5. The fuel injector device according to claim 4, wherein the first fuel plenum and the second fuel plenum are enclosed by a fuel plenum shell, an upstream end of the fuel plenum shell being provided as the pair of first internal walls, wherein the fuel plenum shell is provided within the internal space and is supported by struts, said struts connecting the fuel plenum shell and the pair of first internal walls.

6. The fuel injector device according to claim 1, wherein the trailing edge undulates.

7. The fuel injector device according to claim 1, wherein the fuel injector is a seamless one-piece device.

8. The fuel injector device according to claim 1, configured by additive manufacturing of selective laser melting and selective electron beam melting.

9. A combustor, comprising:
    the fuel injector device according to claim 1.

10. A gas turbine comprising:
    the combustor according to claim 9, wherein the gas turbine is a sequential combustion gas turbine engine and the combustor is a subsequent combustor arranged to be supplied with partly expanded flue gas from a turbine.

11. The fuel injection device according to claim 1, wherein the first fuel plenum is a tubular member placed to extend in a crosswise direction within a second fuel plenum.

12. The fuel injector device according to claim 1, wherein the angle between each wall of the first pair of internal walls and each wall of the second pair of internal walls is greater than or equal to 80°.

* * * * *